(12) United States Patent
Kariya et al.

(10) Patent No.: US 12,479,113 B2
(45) Date of Patent: Nov. 25, 2025

(54) INFORMATION PROCESSING DEVICE, INFORMATION PROCESSING METHOD, AND PROGRAM

(71) Applicant: Sony Interactive Entertainment Inc., Tokyo (JP)

(72) Inventors: Shinichi Kariya, Chiba (JP); Taeko Neda, Tokyo (JP); Kensaku Ishizuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 168 days.

(21) Appl. No.: 18/254,266

(22) PCT Filed: Dec. 7, 2020

(86) PCT No.: PCT/JP2020/045385
§ 371 (c)(1),
(2) Date: May 24, 2023

(87) PCT Pub. No.: WO2022/123616
PCT Pub. Date: Jun. 16, 2022

(65) Prior Publication Data
US 2023/0405851 A1    Dec. 21, 2023

(51) Int. Cl.
*B25J 9/06*        (2006.01)
*B25J 9/16*        (2006.01)
(Continued)

(52) U.S. Cl.
CPC .......... *B25J 19/063* (2013.01); *B25J 13/085* (2013.01)

(58) Field of Classification Search
CPC ....... B25J 19/063; B25J 13/085; B25J 9/1674
(Continued)

(56) References Cited

U.S. PATENT DOCUMENTS 4,601,468 A * 7/1986 Bond ................. A63B 24/00
                                                    482/901
7,212,886 B2 * 5/2007 Nagata .............. B25J 9/1633
                                                    318/568.18
(Continued)

FOREIGN PATENT DOCUMENTS

CN    107708943 A    2/2018
CN    108136604 A    6/2018
(Continued)

OTHER PUBLICATIONS

Extended European Search Report for related EP Application No. 20965006.8, 10 pages, dated Jul. 23, 2024.
(Continued)

*Primary Examiner* — Jaime Figueroa
(74) *Attorney, Agent, or Firm* — Kilpatrick Townsend & Stockton LLP

(57) ABSTRACT

Provided is an information processing device including a measured torque value acquisition section and a contact event detection section. The measured torque value acquisition section acquires a first measured torque value measured by a motor that drives a joint of a housing. In a case where a threshold range is exceeded by the first measured torque value or by a value based on the first measured torque value, the contact event detection section detects a contact event that has occurred on a part of the housing that is coupled by the joint.

12 Claims, 13 Drawing Sheets

(51) Int. Cl.
  *B25J 13/08*   (2006.01)
  *B25J 19/06*   (2006.01)

(58) Field of Classification Search
  USPC .................. 700/245–264; 318/568.11–568.25
  See application file for complete search history.

(56) References Cited

U.S. PATENT DOCUMENTS

| | | | |
|---|---|---|---|
| 7,689,322 B2 | 3/2010 | Tanaka | |
| 10,730,186 B2* | 8/2020 | Haddadin | B25J 9/1653 |
| 10,730,191 B2 | 8/2020 | Muneto | |
| 11,305,422 B2* | 4/2022 | Kasai | B25J 13/088 |
| 11,305,424 B2* | 4/2022 | Yamane | B25J 9/1633 |
| 11,806,095 B2* | 11/2023 | Zucker | A61B 17/86 |
| 2004/0128030 A1* | 7/2004 | Nagata | B25J 9/1633 |
| | | | 700/245 |
| 2006/0020368 A1 | 1/2006 | Tanaka | |
| 2008/0231221 A1 | 9/2008 | Ogawa | |
| 2009/0259338 A1* | 10/2009 | Tong | A63B 23/0355 |
| | | | 700/258 |
| 2011/0060460 A1* | 3/2011 | Oga | B25J 9/1633 |
| | | | 700/254 |
| 2015/0258690 A1* | 9/2015 | Naitou | B25J 19/06 |
| | | | 901/46 |
| 2017/0217013 A1 | 8/2017 | Iqtdar | |
| 2017/0266811 A1* | 9/2017 | Ogawara | B25J 9/1633 |
| 2017/0348855 A1* | 12/2017 | Abe | B25J 9/1674 |
| 2018/0169864 A1* | 6/2018 | Haddadin | G05B 9/03 |
| 2018/0311836 A1 | 11/2018 | Muneto | |
| 2019/0091861 A1* | 3/2019 | Kasai | G05B 13/048 |
| 2021/0268657 A1 | 9/2021 | Yomoda | |
| 2021/0362334 A1* | 11/2021 | Yamane | G05B 19/4155 |
| 2022/0170809 A1* | 6/2022 | Kapadia | H02K 7/14 |

FOREIGN PATENT DOCUMENTS

| | | |
|---|---|---|
| CN | 109262652 A | 1/2019 |
| JP | 63100184 U | 6/1988 |
| JP | 4008484 A | 1/1992 |
| JP | 2000246684 A | 9/2000 |
| JP | 2001287184 A | 10/2001 |
| JP | 2003181152 A | 7/2003 |
| JP | 2005342873 A | 12/2005 |
| JP | 2007301004 A | 11/2007 |
| JP | 2008229800 A | 10/2008 |
| JP | 2009000286 A | 1/2009 |
| JP | 2018185273 A | 11/2018 |
| JP | 2019042906 A | 3/2019 |
| JP | 2020019117 A | 2/2020 |
| KR | 101336802 B1 | 12/2013 |
| WO | 9308049 A1 | 4/1993 |
| WO | 2017073052 A1 | 5/2017 |

OTHER PUBLICATIONS

International Search Report for related PCT Application No. PCT/JP2020/045387, 5 pages, dated Jan. 19, 2021.
International Search Report for related PCT Application No. PCT/JP2020/045386, 5 pages, dated Jan. 19, 2021.
International Search Report for corresponding PCT Application No. PCT/JP2020/045385, 6 pages, dated Jan. 19, 2021.

* cited by examiner

INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

Various types of robots are being researched and developed. Disclosed in PTL 1 is a robotic device including a module that generates a motion synchronized with a motion of a user, according to a user's image inputted through a camera image input device.

CITATION LIST

Patent Literature

[PTL 1] Japanese Patent Laid-Open No. 2005-342873

SUMMARY

Technical Problem

For example, while the above-mentioned robots are being developed, studies are conducted to detect unexpected motions of the robots, such as motions generated by physical interactions between the robots, and utilize the detected motions, for instance, for entertainment purposes. However, technologies for utilizing such motions are not sufficiently proposed.

In view of the above circumstances, it is an object of the present invention to provide an information processing device, an information processing method, and a program that make it possible to detect and utilize unexpected motions of robots.

Solution to Problem

According to an aspect of the present invention, there is provided an information processing device including a measured torque value acquisition section and a contact event detection section. The measured torque value acquisition section acquires a first measured torque value measured by a motor that drives a joint of a housing. In a case where a threshold range is exceeded by the first measured torque value or by a value based on the first measured torque value, the contact event detection section detects a contact event that has occurred on a part of the housing that is coupled by the joint.

According to another aspect of the present invention, there is provided an information processing method including a step of acquiring a first measured torque value measured by a motor that drives a joint of a housing and a step of detecting, in a case where a threshold range is exceeded by the first measured torque value or by a value based on the first measured torque value, a contact event that has occurred on a part of the housing that is coupled by the joint.

According to still another aspect of the present invention, there is provided a program for causing a computer to function as an information processing device including a measured torque value acquisition section and a contact event detection section. The measured torque value acquisition section acquires a first measured torque value measured by a motor that drives a joint of a housing. In a case where a threshold range is exceeded by the first measured torque value or by a value based on the first measured torque value, the contact event detection section detects a contact event that has occurred on a part of the housing that is coupled by the joint.

DESCRIPTION OF EMBODIMENTS

Preferred embodiments of the present invention will now be described in detail with reference to the accompanying drawings. It should be noted that, in this document and the accompanying drawings, component elements having substantially the same functional configuration are designated by the same reference signs and will not be redundantly described.

(System Configuration)

Figure 1:
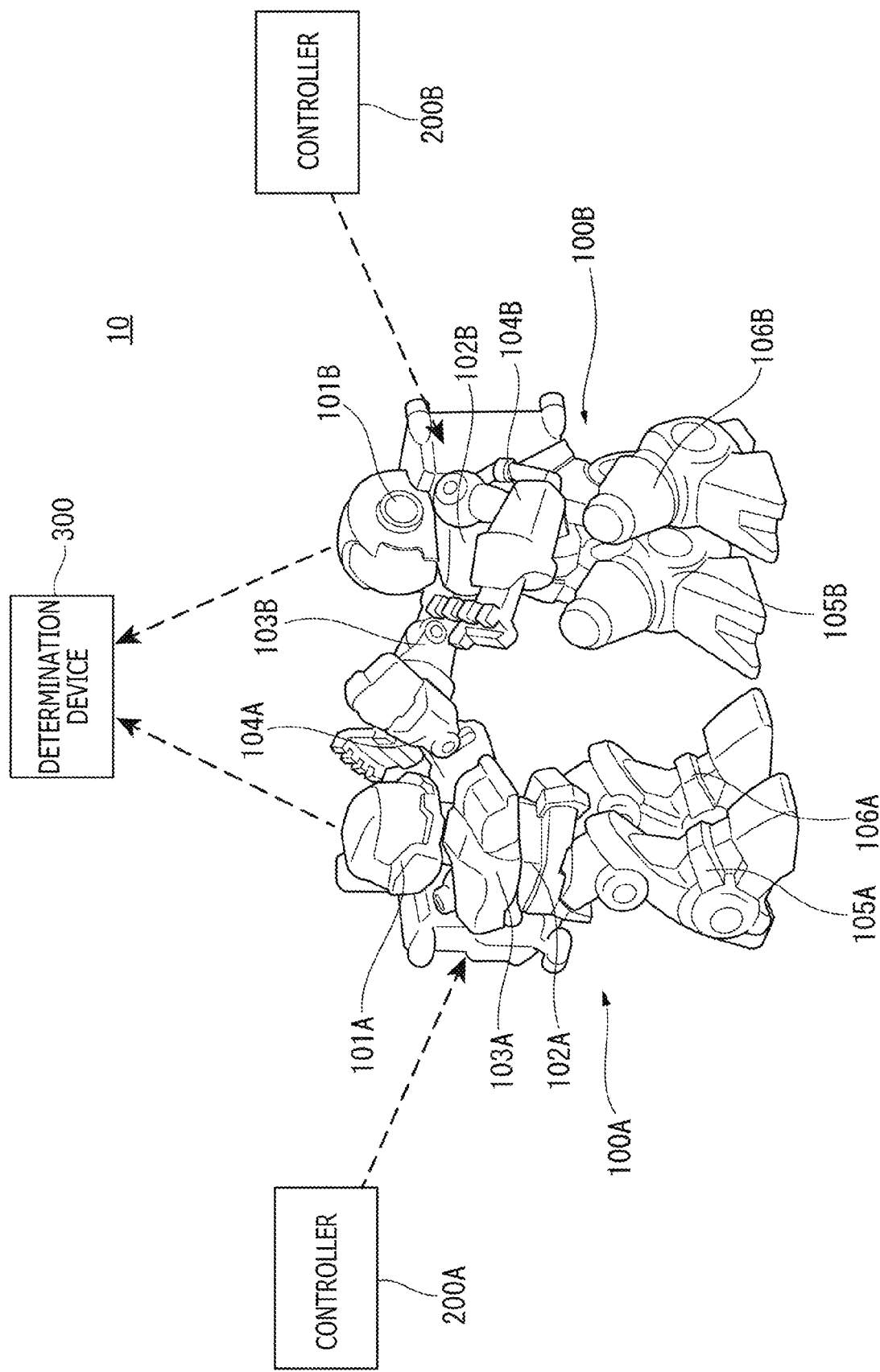
FIG. 1 is a schematic diagram illustrating an example configuration of a system according to an embodiment of the present invention.

FIG. 1 is a schematic diagram illustrating an example configuration of a system according to an embodiment of the present invention. In the present embodiment, a system 10 provides a fighting game played by robots 100A and 100B. The system 10 further includes controllers 200A and 200B and a determination device 300.

The robots 100A and 100B (hereinafter may generically be referred to as a robot 100) respectively include heads 101A and 101B (hereinafter may generically be referred to as a head 101), trunks 102A and 102B (hereinafter may generically be referred to as a trunk 102), arms 103A and 104A and arms 103B and 104B (hereinafter may generically be referred to as arms 103 and 104), and legs 105A and 106A and legs 105B and 106B (hereinafter may generically be referred to as legs 105 and 106).

The controllers 200A and 200B generate operating signals according to user's operating input, for example, to an undepicted button or stick. Alternatively, the controllers 200A and 200B may generate the operating signals according to a user's motion that is identified by motion capture provided, for example, by an undepicted camera or sensor. The operating signals are respectively transmitted from the controller 200A to the robot 100A and from the controller 200B to the robot 100B. The robots 100A and 100B move according to the respective operating signals.

The fighting game is provided by allowing the robots 100A and 100B to respectively move according to the operating signals from the controllers 200A and 200B and drive the arms 103 and 104 and the legs 105 and 106 to attack and defend against an opponent. Rules of the fighting game are not specifically limited to any kind. However, when, for example, an attack made by any one of the arms 103A and 104A of the robot 100A hits the head 101B or the trunk 102B of the robot 100B, points may be given to the robot 100A. The determination device 300 determines the above-described points according to information transmitted respectively from the robots 100A and 100B.

Figure 2:
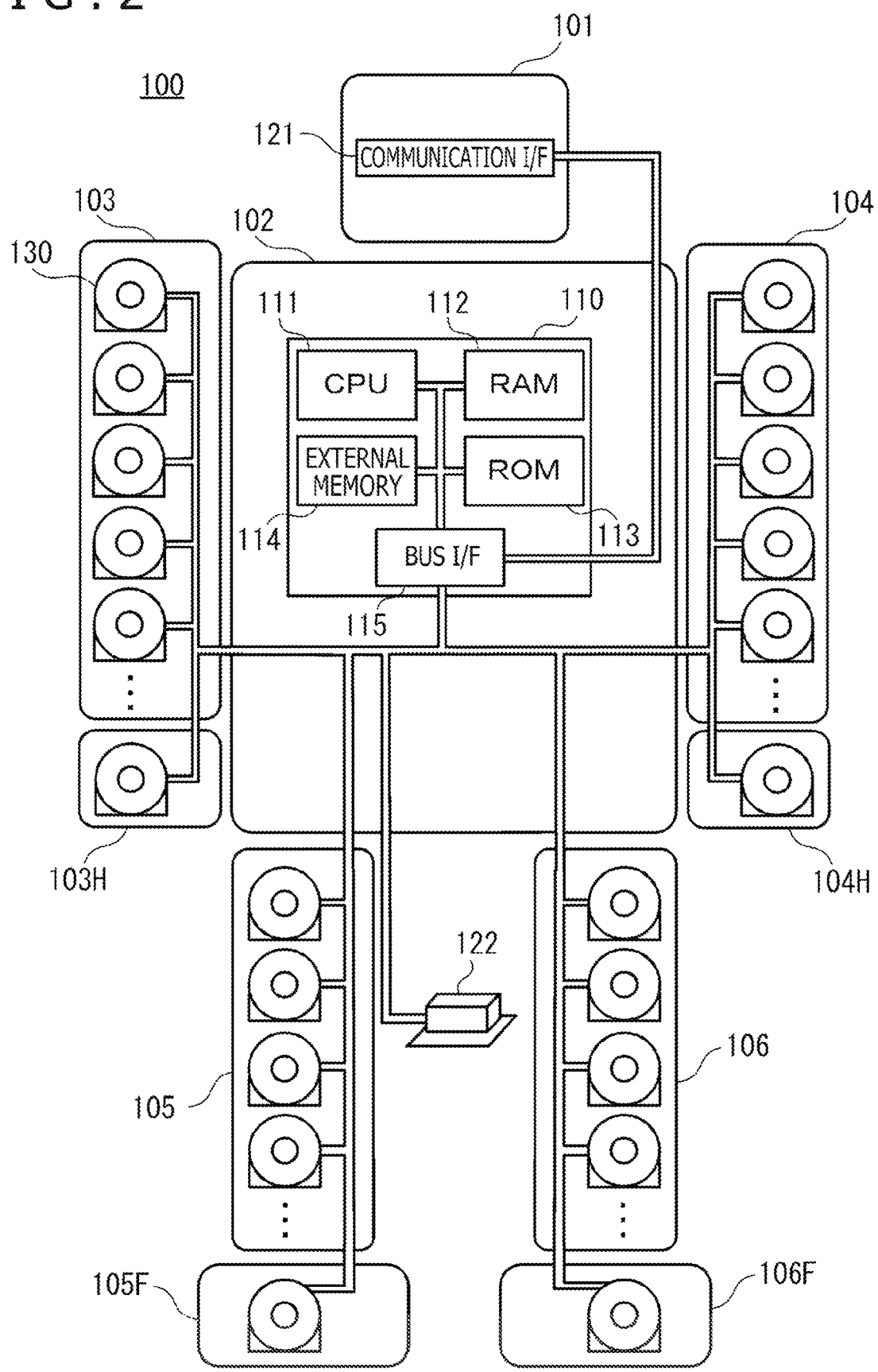
FIG. 2 is a schematic diagram illustrating an example configuration of a robot in the system depicted in FIG. 1.

FIG. 2 is a schematic diagram illustrating an example configuration of the robot in the system depicted in FIG. 1. The robot 100 includes an information processing device 110 that is mounted, for example, in the trunk 102. The information processing device 110 includes, for example, a CPU (Central Processing Unit) 111 for performing arithmetic processing, a RAM (Random Accessory Memory) 112, a ROM (Read Only Memory) 113, and an external memory 114. The information processing device 110 decides motions of individual sections of the robot 100 according to an operating signal or a control signal received by a communication interface 121. The communication interface 121 is connected to the information processing device 110 through a bus interface 115.

The information processing device 110 controls motors 130 to rotationally drive joints of the arms 103 and 104, hands 103H and 104H, the legs 105 and 106, and feet 105F and 106F in such a manner as to perform the decided motions. Although not depicted, the head 101 and the trunk 102 may also be provided with joints that are driven by the motors 130. For example, the CPU 111 in the information processing device 110 selects, from among motion patterns stored in the ROM 113 or the external memory 114, motion patterns corresponding to the decided motions, determines the settings, for example, for leg movement, ZMP (Zero Moment Point) trajectory, trunk movement, upper limb movement, and waist horizontal position and height according to the selected motion patterns, and controls the motors 130 according to setting values of the determined settings.

Further, an IMU (Inertial Measurement Unit) 122 and other sensors are mounted on the robot 100. The sensors are connected to the information processing device 110 through the bus interface 115 to allow the information processing device 110 to refer to sensor output values as needed and control the individual sections of the robot 100. Further, the information processing device 110 may transmit determination information regarding attack and defense, which is acquired by later-described processing, to the determination device 300 depicted in FIG. 1. Alternatively, the information processing device 110 may transmit, for example, at least some of the sensor output values and the selected motion patterns or the setting values for controlling the motors 130 to the determination device 300, which extracts the determination information regarding attack and defense.

Figure 3:
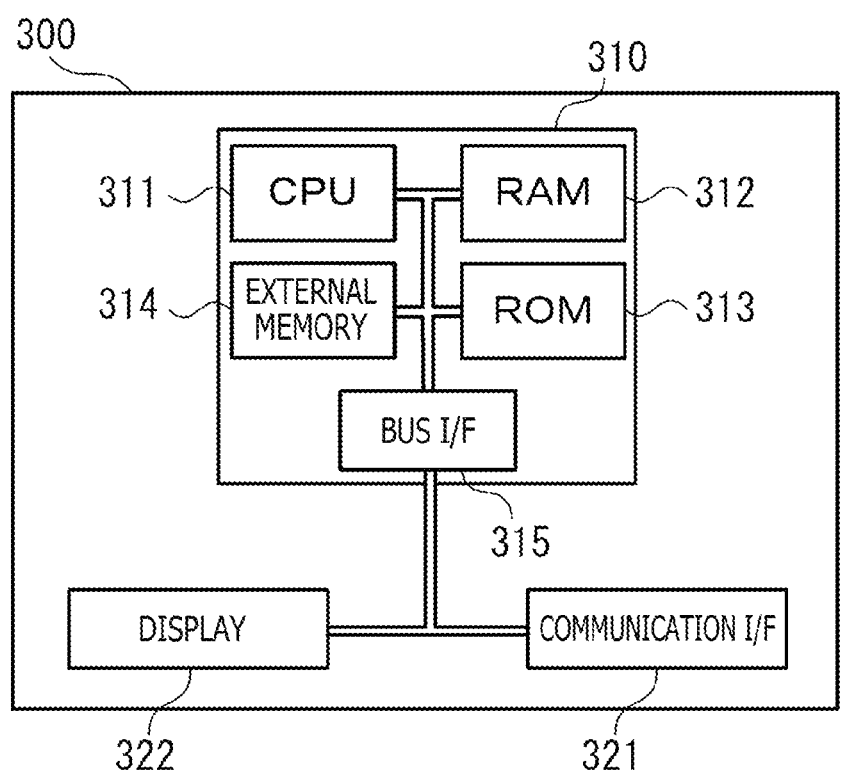
FIG. 3 is a schematic diagram illustrating an example configuration of a determination device in the system depicted in FIG. 1.

FIG. 3 is a schematic diagram illustrating an example configuration of the determination device in the system depicted in FIG. 1. The determination device 300 includes an information processing device 310 and a communication interface 321. The information processing device 310 includes, for example, a CPU 311 for performing arithmetic processing, a RAM 312, a ROM 313, and an external memory 314. The information processing device 310 determines a winner and a loser of the fighting game according to the determination information that the communication interface 321 has received from the robots 100A and 100B, respectively. The result of determination and a game score may be, for example, transmitted to another device, such as a user terminal, through the communication interface 321 and displayed on a display 322. The communication interface 321 and the display 322 are connected to the information processing device 310 through a bus interface 315.

In the present embodiment, a contact event is defined as an element for determining the winner and the loser of the fighting game. The contact event is generated, for example, in a case where the robot 100A hits any part of a housing of the robot 100B during the fighting game. In this instance, two different torque changes occur in the motors that drive various sections of the robots 100A and 100B. One torque change is caused by motions performed according to the operating signals from the controllers 200A and 200B. The other torque change is caused by a force applied when an opponent's robot, which is an external object, comes into contact with the housing. The magnitude and the timing of the former torque change, including the torque change caused, for example, by contact with the floor surface, are predictable from the motion patterns set for the robot 100 and the sensor output values. Meanwhile, the magnitude and the timing of the latter torque change vary with the position and the motion of the robot 100B and are thus difficult to predict in a manner similar to that of the former. An event involving a torque change caused by the contact with such an external object is referred to as the contact event in this document.

The contact event, which is defined as described above, is further divided into an active contact event and a passive contact event. For example, in a case where the robot 100A hits any part of the housing of the robot 100B, the contact event occurs in the hit robot 100B. In this case, no motion for attacking is performed by the robot 100B. Therefore, it is difficult to predict an event occurrence itself in the robot 100B. In this case, it is said that a passive contact event has occurred on the robot 100B. Meanwhile, in the above case, a motion for attacking is performed by the robot 100A. Therefore, a contact event occurrence itself on the robot 100A is predictable. In such a case, it is said that an active contact event has occurred on the robot 100A. However, in a case, for example, where an avoidance motion is performed by the robot 100B, it is possible that a predicted contact event may not occur. Further, even in a case where a contact event occurs, the magnitude and the timing of a torque change are dependent on the position and the motion of the robot 100B. Therefore, it is difficult to predict the magnitude and the timing of the torque change even in the case of an active contact event.

In the present embodiment, the above-described passive contact event and active contact event are detected on both the robot 100A side and the robot 100B side, and the results of the detection are then integrated to determine the winner and the loser of the fighting game. As functional component elements for achieving such purposes, the system 10 includes a measured torque value acquisition section 510, an angle difference value acquisition section 520, a contact event detection section 530, an activeness determination section 540, and a score increase section 550. These functional component elements are, in the system 10 depicted in FIG. 1, implemented in the information processing device 110 possessed by the robot 100 or implemented in the information processing device 310 possessed by the determination device 300.

Figure 4A:
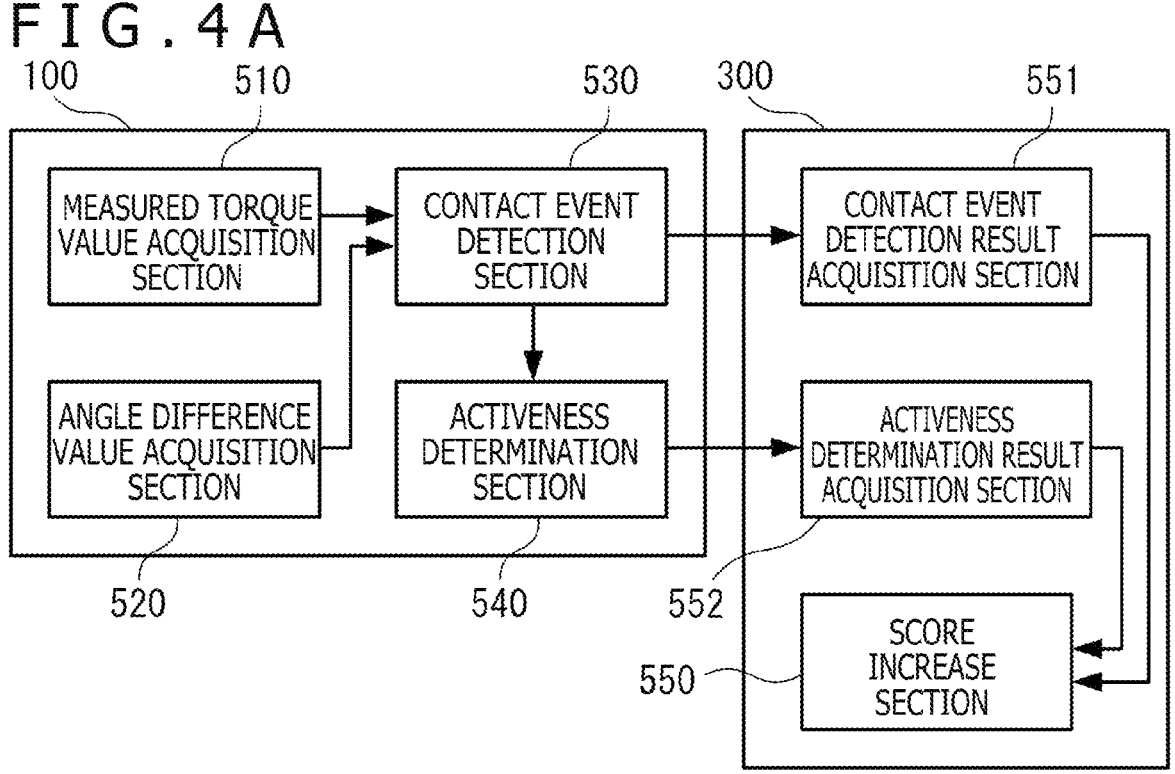
FIG. 4A is a block diagram illustrating a first example of a functional configuration regarding contact event detection and determination.

Specifically, as depicted in FIG. 4A, the measured torque value acquisition section 510, the angle difference value acquisition section 520, the contact event detection section 530, and the activeness determination section 540 may be implemented in the robot 100, and the score increase section 550 may be implemented in the determination device 300. In this case, the determination device 300 includes a contact event detection result acquisition section 551 and an activeness determination result acquisition section 552. The contact event detection result acquisition section 551 receives the results of detection of contact events in the robot 100A and the robot 100B. The activeness determination result acquisition section 552 receives the result of determination of activeness of contact events in the robot 100A and the robot 100B.

Figure 4B:
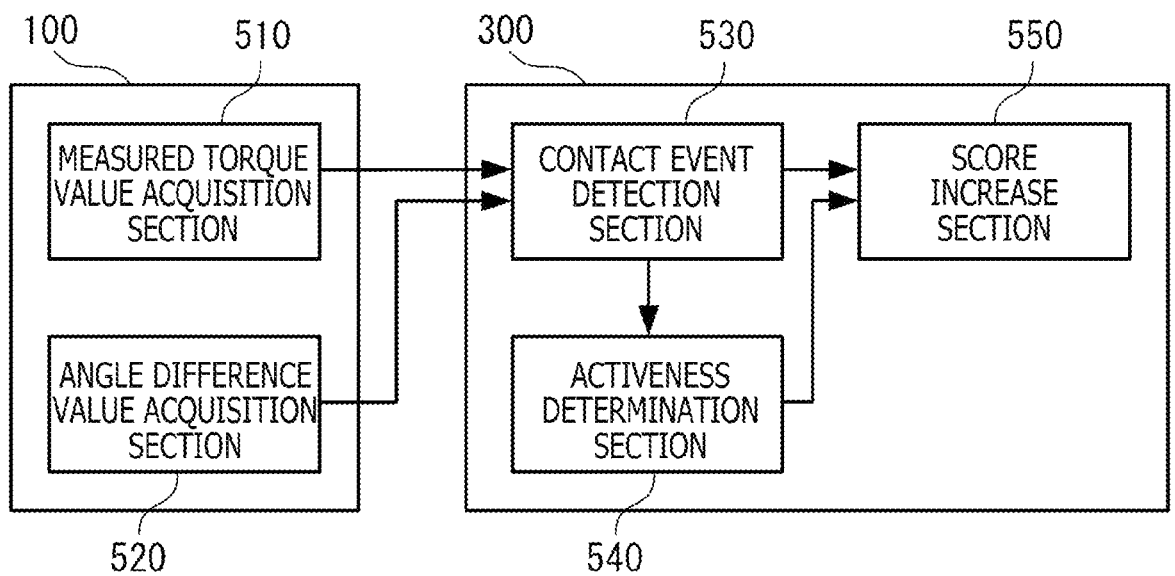
FIG. 4B is a block diagram illustrating a second example of the functional configuration regarding contact event detection and determination.

Alternatively, as depicted in FIG. 4B, the measured torque value acquisition section 510 and the angle difference value acquisition section 520 may be implemented in the robot 100, and the contact event detection section 530, the activeness determination section 540, and the score increase section 550 may be implemented in the determination device 300. In this case, the functions of the contact event detection result acquisition section and the activeness determination result acquisition section described above are included in the contact event detection section 530 and the activeness determination section 540. Each of the functional component elements is further described below.

The measured torque value acquisition section 510 acquires measured torque values that are measured by the motors that drive the joints of the housing of the robot 100. As mentioned earlier, the housing of the robot 100 includes, for example, the head 101, the trunk 102, and the arms 103 and 104, and the joints for coupling them together are driven by the motors 130. The measured torque values are acquired, for example, by measuring currents flowing to the motors 130. In a case where the joints can be driven in a plurality of directions (e.g., roll, pitch, and yaw directions), the measured torque values of the motors that drive the joints in the respective directions may be acquired. The acquired measured torque values may be processed in real time by the contact event detection section 530. Alternatively, the measured torque values acquired in time series may be buffered for a predetermined period of time to calculate, for example, a time difference and a moving average.

The angle difference value acquisition section 520 acquires angle difference values that represent the differences between measured angle values and indicated angle values regarding the motors that drive the joints of the housing of the robot 100. The measured angle values are acquired, for example, as output values of potentiometers or encoders attached to the joints driven by the motors. The indicated angle values are target values of rotation angles of the respective motors 130 that are decided, for example, by the information processing device 110.

The contact event detection section 530 detects a contact event that has occurred on a part of the housing that is coupled by a joint driven by the motor 130 related to a measured torque value, in a case where a threshold range is exceeded by the measured torque value acquired by the measured torque value acquisition section 510 or by a value based on the measured torque value. More specifically, in a case, for example, where the threshold range is exceeded by the measured torque value of a motor that drives a joint coupling the head 101 and the trunk 102 of the robot 100 or by a value based on the measured torque value, the contact event detection section 530 detects a contact event that has occurred on the head 101 or the trunk 102.

In the above instance, the threshold range used for contact event detection by the contact event detection section 530 corresponds to the range of measured torque values that are detected by the respective motors during a normal operation, that is, in a case where the motors that drive the joints of the robot 100 operate according to the motion patterns decided by the information processing device 110 and no unexpected external force is applied. The threshold range is decided, for example, by actually measuring the torque values when the robot 100 performs various motions. The threshold range may be individually set for each of the joints and motor drive directions (e.g., roll, pitch, and yaw directions). Alternatively, a common threshold range may be set for two or more joints and drive directions.

In a case, for example, where the measured torque value is simply outside the threshold range, that is, the measured torque value is greater than the maximum value of the threshold range or smaller than the minimum value of the threshold range, the above-described contact event detection section 530 may detect a contact event. Alternatively, the contact event detection section 530 may detect a contact event in a case where the threshold range is exceeded, as described later with reference to an example, by a component of the measured torque value, the component having a frequency that is equal to or lower than a predetermined frequency, or in a case where the threshold range is exceeded by the time difference of the measured torque value. Further, the contact event detection section 530 may detect a contact event according to the ratios of a plurality of measured torque values, as described later with reference to an example, and further according to the angle difference values acquired by the angle difference value acquisition section 520.

The activeness determination section 540 determines whether or not the contact event detected by the contact event detection section 530 is active. Here, as mentioned earlier, the occurrence itself of an active contact event is predictable because the robot 100 has performed a motion invoking the active contact event. Specifically, in a case where a contact event is detected on moved portions included in the parts of the housing of the robot 100, the activeness determination section 540 determines that the contact event is active. For example, the activeness determination section 540 is able to identify the moved portions of the robot 100 according to the motion patterns of joints that are decided by the information processing device 110. Further, as described later with reference to an example, in a case where, as regards the trunk 102 of the robot 100 and the arms 103 and 104 supported by the trunk 102, the hands 103H and 104H, which are the ends of the arms 103 and 104, are in a predetermined positional relation with the trunk 102, the activeness determination section 540 may identify the arms 103 and 104, which include the hands 103H and 104H, as the moved portions. In the present embodiment, a contact event not determined as an active one by the activeness determination section 540 is handled as a passive contact event.

As regards each of the robots 100A and 100B, the score increase section 550 determines the winner and the loser of the fighting game according to the result of contact event detection by the contact event detection section 530 and the result of contact event activeness determination by the activeness determination section 540. More specifically, in a case, for example, where a first contact event detected on the robot 100A is active and a second contact event detected on the robot 100B synchronously with the first contact event is inactive, the score increase section 550 determines that the robot 100A has successfully attacked the robot 100B, and then increases the score of the robot 100A. A specific example of such a process of the score increase section 550 will be described later.

(Specific Example of Contact Event Detection)

Figure 5:
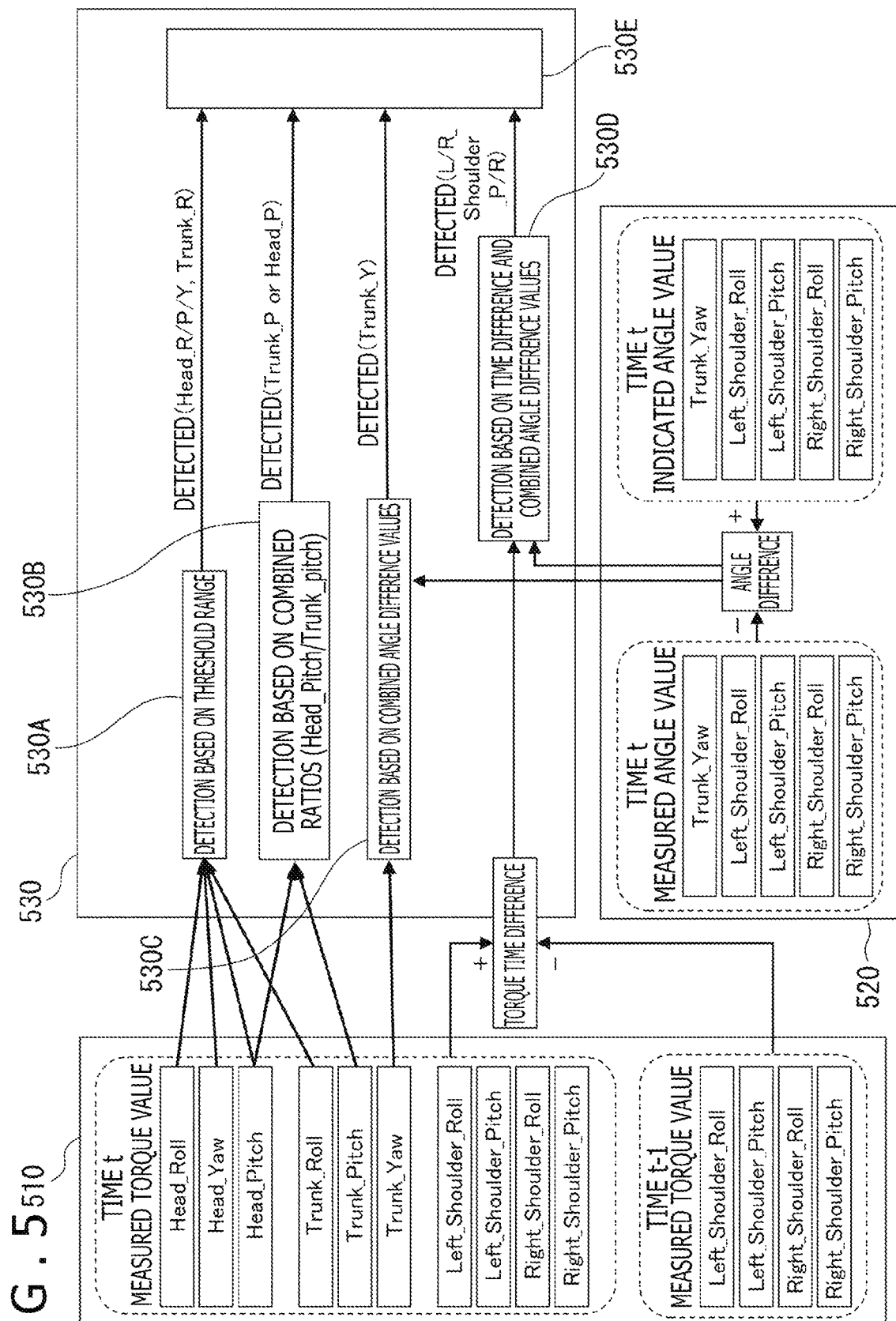
FIG. 5 is a diagram illustrating a specific example of a functional configuration for contact event detection in an embodiment of the present invention.

FIG. 5 is a diagram illustrating a specific example of a functional configuration for contact event detection in an embodiment of the present invention. In the example depicted in FIG. 5, the measured torque value acquisition section 510 acquires three-directional measured torque values (Head_Roll, Head_Pitch, Head_Yaw) of the motor that drives the joint coupling the head 101 and the trunk 102, three-directional measured torque values (Trunk_Roll, Trunk_Pitch, Trunk_Yaw) of the motor that drives the joint coupling two sections in the trunk 102, and two-directional measured torque values (Left_Shoulder_Roll, Left_Shoulder_Pitch, Right_Shoulder_Roll, Right_Shoulder_Pitch) of the motors that drive shoulder joints coupling the trunk 102 and the arms 103 and 104. Meanwhile, the angle difference value acquisition section 520 acquires the angle difference value (Trunk_Yaw) of the motor that drives the joint coupling the two sections in the trunk 102 and the angle difference values (Left_Shoulder_Roll, Left_Shoulder_Pitch, Right_Shoulder_Roll, Right_Shoulder_Pitch) of the motors that drive the above-mentioned shoulder joints. It should be noted that, in FIG. 5, Roll, Pitch, and Yaw are respectively abbreviated to R, P, and Y in some cases.

In the depicted example, the contact event detection section 530 includes contact event detection sections 530A to 530D and a contact event detection section 530E. The contact event detection sections 530A to 530D detect a contact event by comparing the measured torque value with the threshold range in different ways. The contact event detection section 530E integrates the results of contact event detection. Each of these sections is further described below.

(Detection Using Measured Torque Values)

Figure 6A:
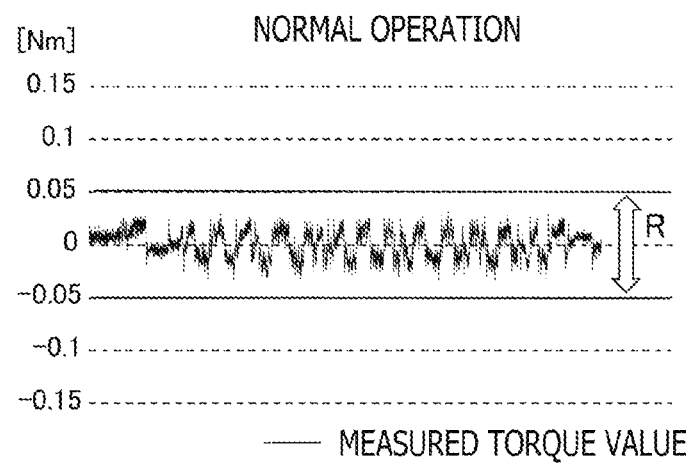
FIG. 6A is a diagram illustrating an example of a comparison between a measured torque value and a threshold range.
Figure 6B:
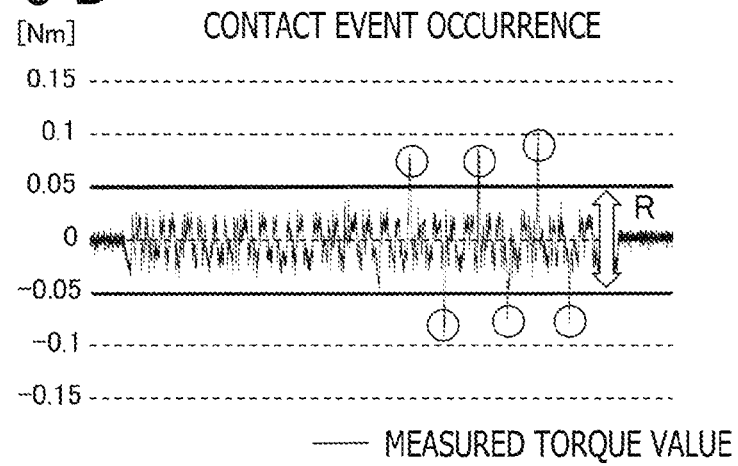
FIG. 6B is a diagram illustrating an example of the comparison between the measured torque value and the threshold range.

The contact event detection section 530A determines whether or not the threshold range is exceeded respectively by the measured torque values (Head_Roll, Head-Pitch, Head_Yaw) of the head 101 and the measured torque value (Trunk_Roll) of the trunk 102. Examples of comparison between the measured torque values and the threshold range are depicted in FIGS. 6A and 6B. As depicted in FIG. 6A, as regards the motors that drive various sections of the robot 100, the torque values measured during a normal operation do not exceed a threshold range R. As mentioned earlier, the threshold range R is decided, for example, by collecting the torque values actually measured during a normal operation of the robot 100. It should be noted that, although the depicted example indicates that the positive and negative sides of the threshold range R are equally set around zero (0), the threshold range R may be biased toward the positive side or the negative side.

Figure 7:
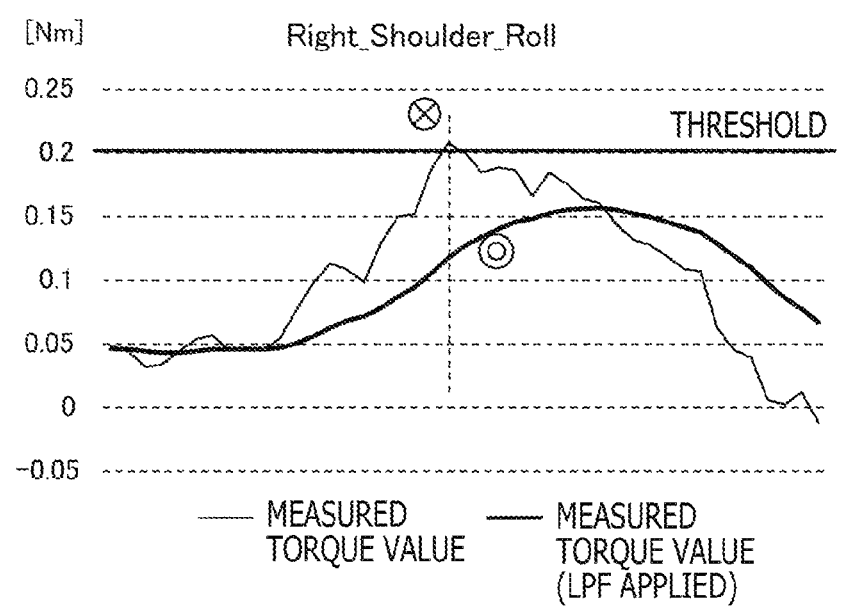
FIG. 7 is a diagram illustrating an example in which a low-pass filter is applied to the measured torque value.

Meanwhile, when a contact event occurs, the measured torque values of the motors exceed the threshold range R as depicted in FIG. 6B. Therefore, in a case where the measured torque values (Head_Roll, Head_Pitch, Head_Yaw, Trunk_Roll) exceed the respectively set threshold range R, the contact event detection section 530A detects a contact event on at least either the head 101 or the trunk 102. In this instance, as depicted in FIG. 7, the contact event detection section 530A (and the other event detection sections as well) may apply a low-pass filter to the measured torque values, and detect a contact event in a case where the threshold range R is exceeded by a component of the measured torque values, the component having a frequency that is equal to or lower than a predetermined frequency. The measured torque values can include a high-frequency component due to noise or measurement error. Therefore, detection error can be reduced to increase the accuracy of contact event detection, by removing components higher in frequency than the fluctuation frequency of measured torque values caused by a contact event.

(Detection where Ratios of Measured Torque Values in Joints are Combined)

Referring again to FIG. 5, in a case where the threshold range is exceeded by the measured torque value (Trunk_Pitch) of the trunk 102, the contact event detection section 530B detects, if the threshold is exceeded by the ratio (Head_Pitch/Trunk_Pitch) of the measured torque value (Head_Pitch) of the head 101 to the measured torque value (Trunk_Pitch) of the trunk 102, a contact event that has occurred on the head 101, and detects, if the threshold is not exceeded by the ratio, a contact event that has occurred on the trunk 102. Since the above-described determination is made, it is possible to properly identify whether the contact event has occurred in the head 101 or in the trunk 102.

Figure 8:
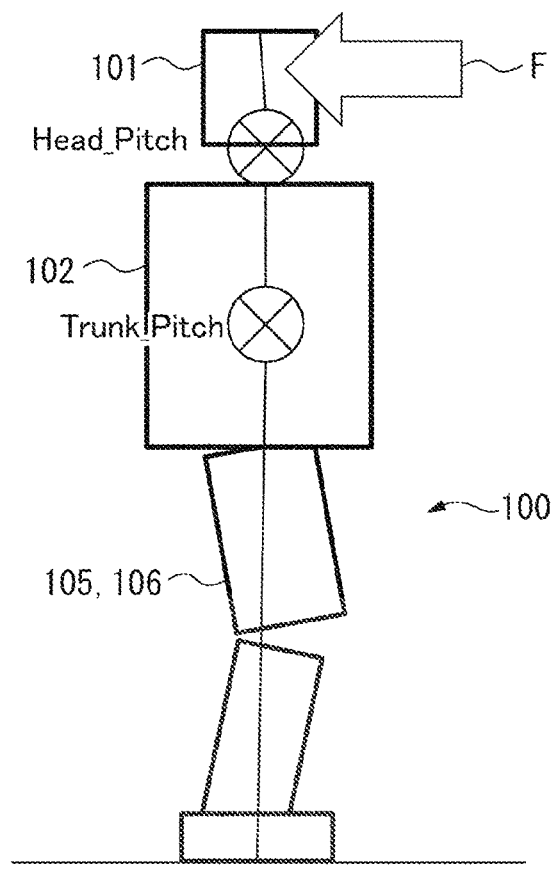
FIG. 8 is a diagram illustrating an example of the structure of the robot.

As depicted in FIG. 8, the legs 105 and 106, which are at the bottom of the robot 100, are constrained ends in contact with the floor surface, whereas the head 101, which is at the top of the robot 100, is a free end. That is, the housing of the robot 100 includes the legs 105 and 106 and a lower portion of the trunk 102, which form a first part, an upper portion of the trunk 102, which is a second part supported by the first part, and the head 101, which is a third part supported by the second part to form the free end. In such a case, the fluctuations in the torque values measured in a case where a force F is applied by a contact event that has occurred on the third part forming the free end tends to be more conspicuously observed at a joint between the second part and the first part than at a joint between the third part and the second part. More specifically, in a case where a contact event has occurred on the head 101, the fluctuation in the measured torque value (Trunk_Pitch) of the joint coupling the two sections in the trunk 102 tends to be more conspicuously observed than the measured torque value (Head_Pitch) of the joint coupling the head 101 and the trunk 102. Therefore, it is not easy to distinguish the above case from a case where the measured torque value (Trunk_Pitch) of the trunk 102 fluctuates due to a contact event occurrence on the trunk 102.

Figure 9A:
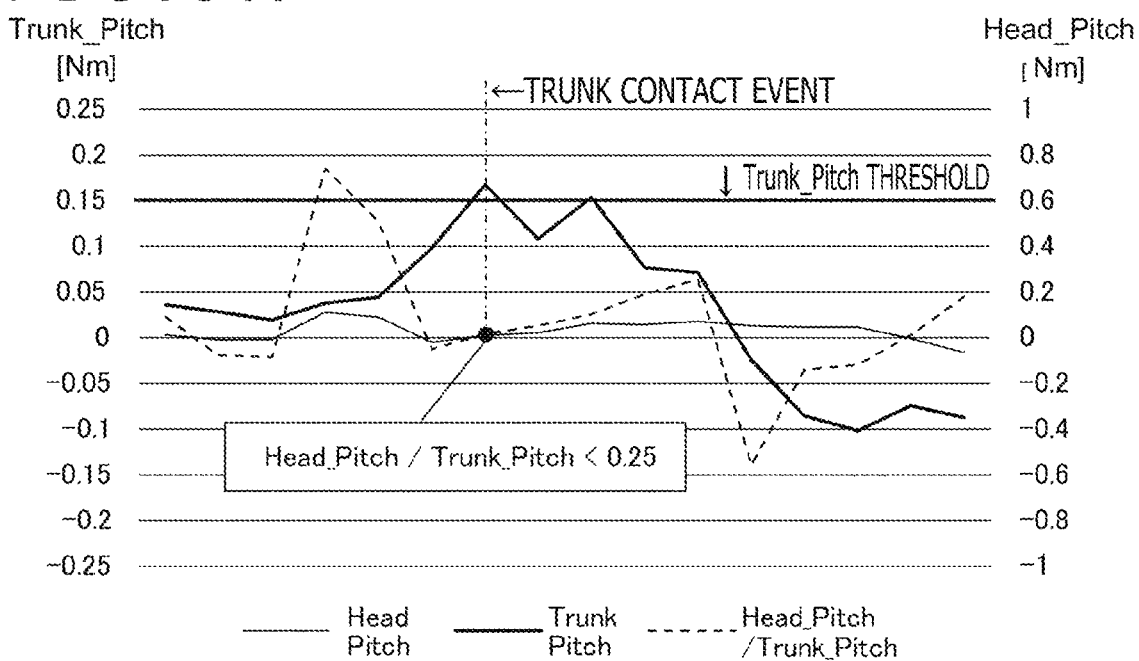
FIG. 9A is a diagram illustrating an example of detection where the ratios of measured torque values in a plurality of joints are combined.
Figure 9B:
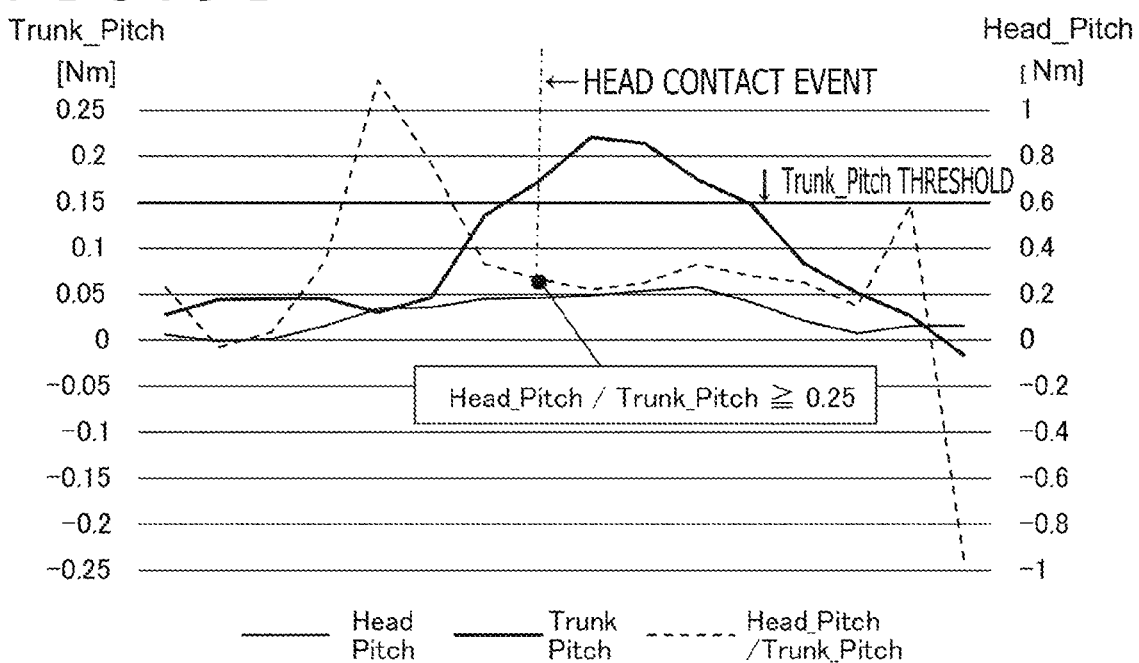
FIG. 9B is a diagram illustrating an example of detection where the ratios of the measured torque values in the plurality of joints are combined.

FIGS. 9A and 9B illustrate the measured torque values (Head_Pitch, Trunk_Pitch) and the ratio between such measured torque values (Head_Pitch/Trunk_Pitch) in two different cases. In one of the two cases, it is assumed that a contact event has occurred on the trunk 102 due to an external attack. In the other case, it is assumed that a contact event has occurred on the head 101 due to an external attack. As depicted in both examples of FIGS. 9A and 9B, the measured torque values (Trunk_Pitch) of the trunk 102 similarly exhibit a great positive fluctuation and exceed the threshold (the maximum value of the threshold range R), and the measured torque values (Head_Pitch) of the head 101 similarly exhibit a small fluctuation and do not exceed the threshold. Meanwhile, the ratio between the measured torque values (Head_Pitch/Trunk_Pitch) is almost zero (0) in the example of FIG. 9A, but is equal to or greater than 0.25 in the example of FIG. 9B. This indicates a difference between these two cases. The reason is that the measured torque value of the head 101 remains almost unchanged in the case of FIG. 9A where a contact event has occurred on the trunk 102, whereas, in the case of FIG. 9B where a contact event has occurred on the head 101, the measured torque value of the head 101 also changes although the change is not as great as the change observed in the case of the trunk 102.

Consequently, in the cases indicated by the above examples depicted in FIGS. 9A and 9B, when a threshold of 0.25 is set for the ratio between the measured torque values (Head_Pitch/Trunk_Pitch), it can be determined that a contact event has occurred on the head 101 in a case where the threshold is exceeded by the ratio, and that a contact event has occurred on the trunk 102 in a case where the threshold is not exceeded by the ratio. It should be noted that the above-mentioned ratio threshold is merely an example. In some other cases, a proper threshold can be set, for example, by collecting actual measurement values of the ratio measured upon a contact event occurrence on the head 101 and actual measurement values of the ratio measured upon a contact event occurrence on the trunk 102.

(Detection where Angle Difference Values are Combined)

Referring again to FIG. 5, in a case where the threshold range is exceeded by the measured torque value (Trunk_Yaw) of the motor that drives the joint coupling the two sections in the trunk 102 and exceeded by the angle difference value of the motor, the contact event detection section 530C detects a contact event that has occurred on the trunk 102. As described later, the measured torque values fluctuate relatively greatly depending on the posture of the robot 100, whereas the angle difference values are slightly dependent on the posture of the robot 100. Therefore, the accuracy of contact event detection can be increased with use of the angle difference values.

Figure 10A:
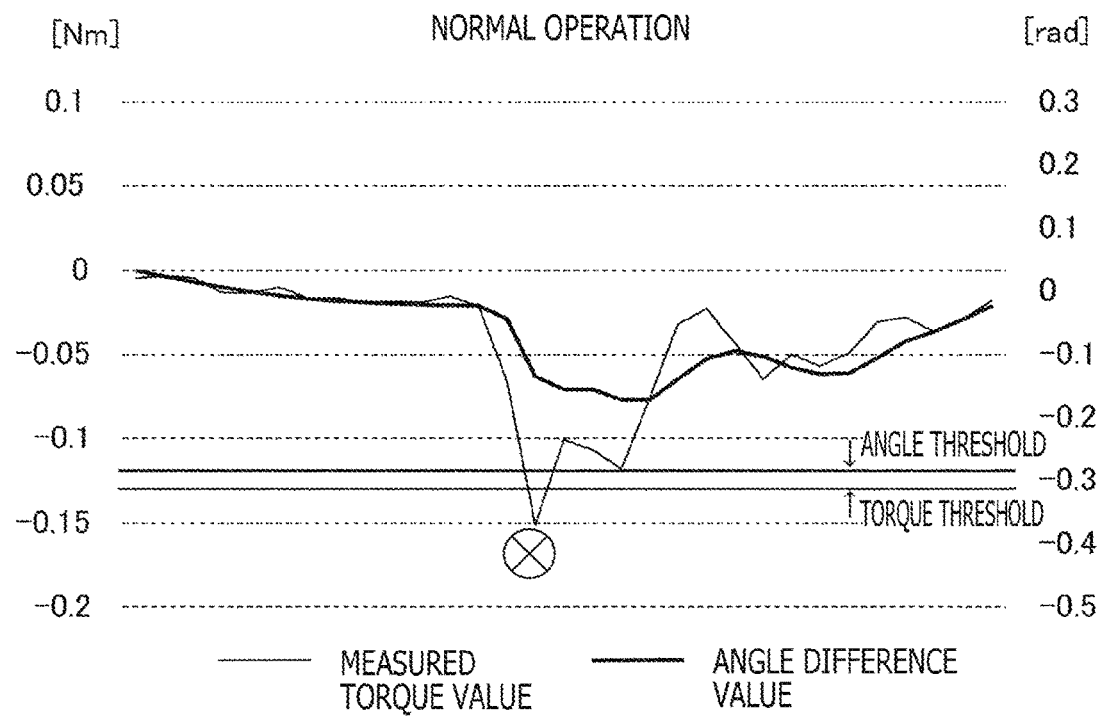
FIG. 10A is a diagram illustrating an example of detection where angle difference values are combined.
Figure 10B:
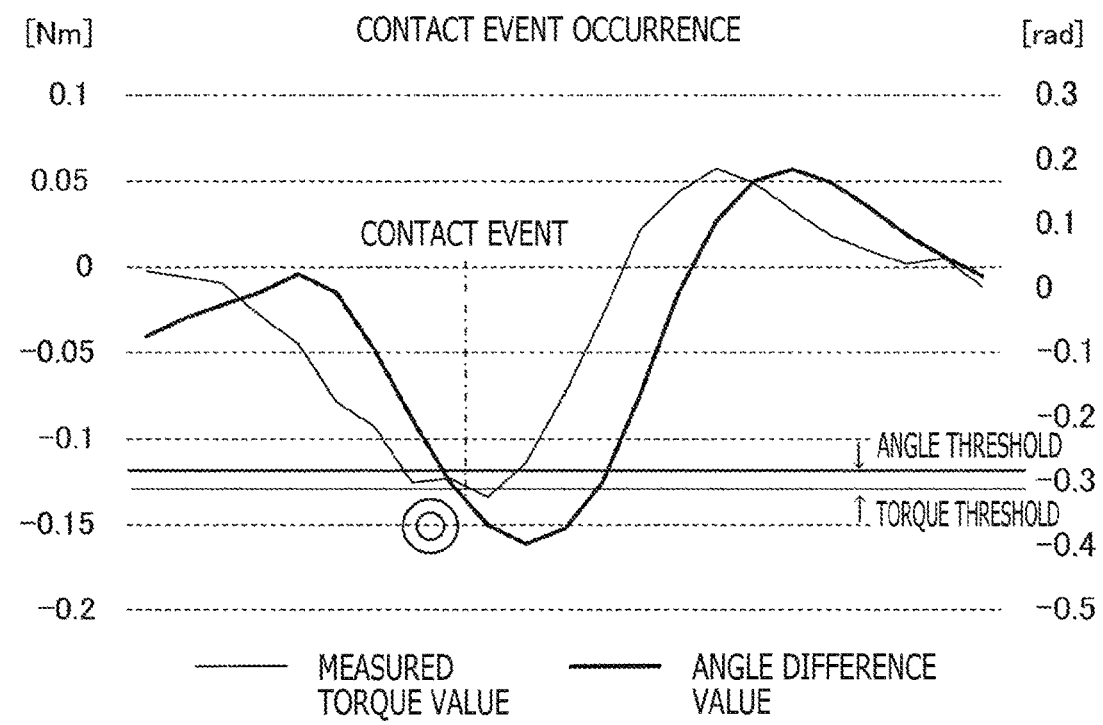
FIG. 10B is a diagram illustrating an example of detection where the angle difference values are combined.

FIGS. 10A and 10B illustrate the measured torque values and the angle difference values in two different cases. In one of the two cases, it is assumed that a contact event has not actually occurred on the trunk 102. In the other case, it is assumed that a contact event has occurred on the trunk 102. As depicted in both examples of FIGS. 10A and 10B, the threshold range is exceeded by the measured torque values. Meanwhile, the threshold is not exceeded by the angle difference value depicted in the example of FIG. 10A, but is exceeded by the angle difference value depicted in the example of FIG. 10B. Therefore, as long as a contact event is detected under conditions where the threshold is exceeded by the angle difference value, erroneous detection can be prevented in a case where the measured torque value fluctuates, for example, due to changes in the posture of the robot 100 although no contact event has occurred as depicted in FIG. 10A.

(Detection Using Time Difference)

Referring again to FIG. 5, in a case where the threshold range is exceeded by the time difference between the measured torque values (Left_Shoulder_Roll, Left_Shoulder_Pitch, Right_Shoulder_Roll, Right_Shoulder_Pitch) of the motors that drive the shoulder joints and exceeded by the angle difference values of the motors, the contact event detection section 530D detects a contact event that has occurred on the associated arms 103 and 104. More specifically, instead of using a torque value detected at one time t, the contact event detection section 530D compares the threshold range with the time difference, that is, the difference between the torque values measured at time t and at time t−1. As regards the sections such as the arms 103 and 104, the difference between the amount of fluctuation in a torque value detected during a normal operation and the amount of fluctuation in a torque value detected upon the occurrence of a contact event is small. Therefore, the accuracy of detection is not likely to increase in a case where the detected torque value is simply compared with the threshold range. Meanwhile, the amount of fluctuation per time in the torque value detected in a case where a contact event has occurred is larger than the amount of fluctuation per time in the torque value detected during a normal operation. Consequently, contact event detection can properly be made by using the time difference. It should be noted that the contact event detection section 530D is able to achieve event detection more accurately by using the angle difference values of the motors, as is the case with the above example of the contact event detection section 530C, in addition to the time difference between detected torque values. However, combining the time difference between the detected torque values with the angle difference values is not necessarily required.

In the example of FIG. 5, which is described above, the contact event detection section 530E integrates the results of contact event detection made by the contact event detection sections 530A to 520D. More specifically, in a case, for example, where a contact event that has occurred on the head 101 is detected by both of the contact event detection sections 530A and 530B, the contact event detection section 530E may determine that the contact event has occurred on the head 101. Further, in a case where a contact event that has occurred on the trunk 102 is detected by all of the contact event detection sections 530A, 530B, and 530C, the contact event detection section 530E may determine that the contact event has occurred on the trunk 102. As regards the arms 103 and 104, the contact event detection section 530E may use the result of determination made by the contact event detection section 530D, on an as-is basis. The contact event detection section 530E may determine the occurrence of a contact event according to the logical conjunction (logical AND) of individual detection results as described above. In some other examples, however, the contact event detection section 530E may determine the occurrence of a contact event according to the logical disjunction (logical OR) of individual detection results.

(Determination of Activeness)

In a case where a contact event is detected on a moved portion of the robot 100 as described above, the activeness determination section 540 may determine that the contact event is active. The moved portion may be identified based on the motion pattern of the joint decided by the information processing device 110 or based on the fluctuation in the joint's torque value measured before and after contact event detection. For example, in a case where the measured torque value is within the threshold range but has fluctuated more greatly than the other joints before and after contact event detection, the activeness determination section 540 may identify a portion coupled by the relevant joint, as the moved portion. Further, as described below, the activeness determination section 540 may identify the moved portion according to the positional relation between the relevant parts of the housing at the time of contact event detection.

Figure 11A:
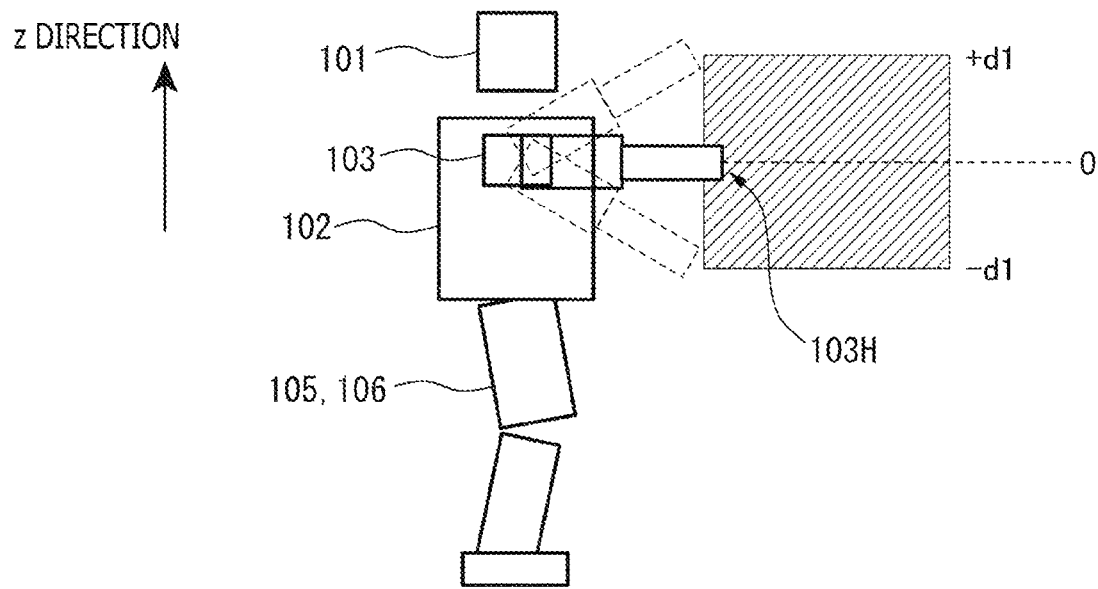
FIG. 11A is a diagram illustrating an example of determination of contact event activeness in an embodiment of the present invention.
Figure 11B:
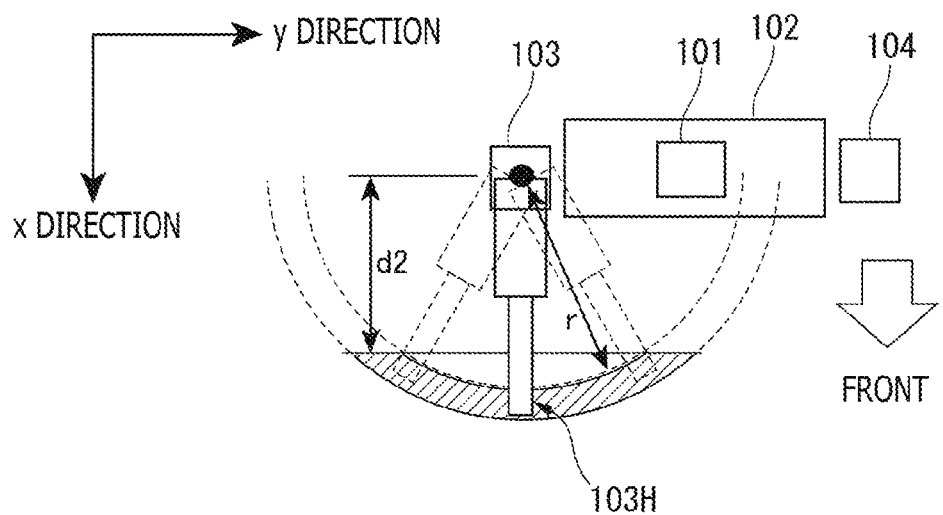
FIG. 11B is a diagram illustrating the example of determination of contact event activeness in the embodiment of the present invention.

FIGS. 11A and 11B are diagrams illustrating an example of determination of contact event activeness in an embodiment of the present invention. In this example, the activeness determination section 540 identifies a moved portion according to the positional relation at the time of contact event occurrence between the hands 103H and 104H, which are the ends of the arms 103 and 104, and the trunk 102. In the depicted example, in a case where either the hand 103H or the hand 104H is positioned in front of the trunk 102 and within a predetermined height range (±d1) referenced to the shoulder joints coupling the trunk 102 and the arms 103 and 104 as indicated in FIG. 11A, the front-to-rear distance to the trunk 102 is equal to a threshold d2 as indicated in FIG. 11B, and the linear distance from the shoulder joints is equal to or greater than a threshold r, the arm 103 or 104/arms 103 and 104 including the hand 103H or 104H/hands 103H and 104H satisfying the conditions is/are identified as the moved portion/portions. It should be noted that dimensions indicated in FIGS. 11A and 11B are applicable to a case where the adopted robot 100 is of a small size. The dimensions and the ratio between the dimensions are set as appropriate based on the size and the shape of the robot 100.

Figure 12:
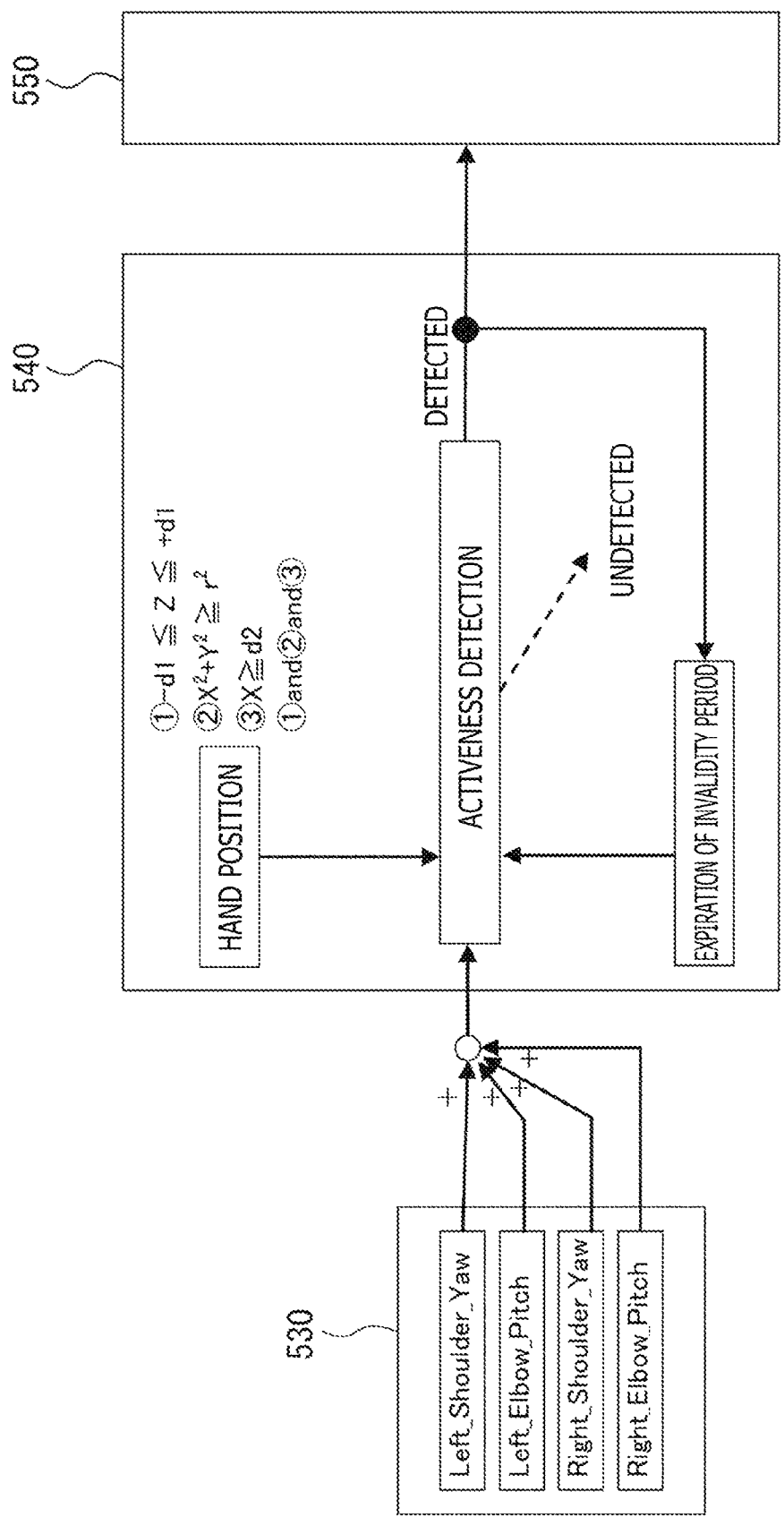
FIG. 12 is a schematic diagram illustrating a process of detecting an active contact event in the embodiment.

FIG. 12 is a schematic diagram illustrating a process of detecting an active contact event in the present embodiment. In the example depicted in FIG. 12, first of all, a contact event is detected based on the measured torque values (Left_Shoulder_Yaw, Left_Elbow_Pitch, Right_Shoulder_Yaw, Right_Elbow_Pitch) of motors that drive the shoulder joints and elbow joints of the arms 103 and 104. In this instance, the contact event may be detected by simply comparing the measured torque values with the threshold range as indicated earlier in the example described with reference to FIG. 5 or by comparing the component of the measured torque values, the component having a frequency equal to or lower than a predetermined frequency, and the time difference with the threshold range as indicated earlier in the examples described with reference, for example, to FIG. 5. Moreover, the contact event may be detected further based on the ratio between a plurality of measured torque values and on the angle difference values.

In a case where a contact event is detected with respect to any one of the above-mentioned measured torque values (logical OR), the activeness of the contact event is determined. More specifically, for example, the positions of the hands 103H and 104H are calculated from the measured angle values of the relevant joints to determine whether or not the positional relation described earlier with reference to FIGS. 12A and 12B is obtained between the trunk 102 and the hands 103H and 104H. Further, in order to prevent a single contact event from being detected a plurality of times, an invalidity period of a predetermined length is set upon a single detection of an active contact event to avoid the detection of a subsequent active contact event before the expiration of the invalidity period. In a case where a contact event is detected, the hands 103H and 104H are positioned to satisfy the conditions, and the invalidity period has already expired, the activeness determination section 540 determines that the contact event is active.

Figure 13:
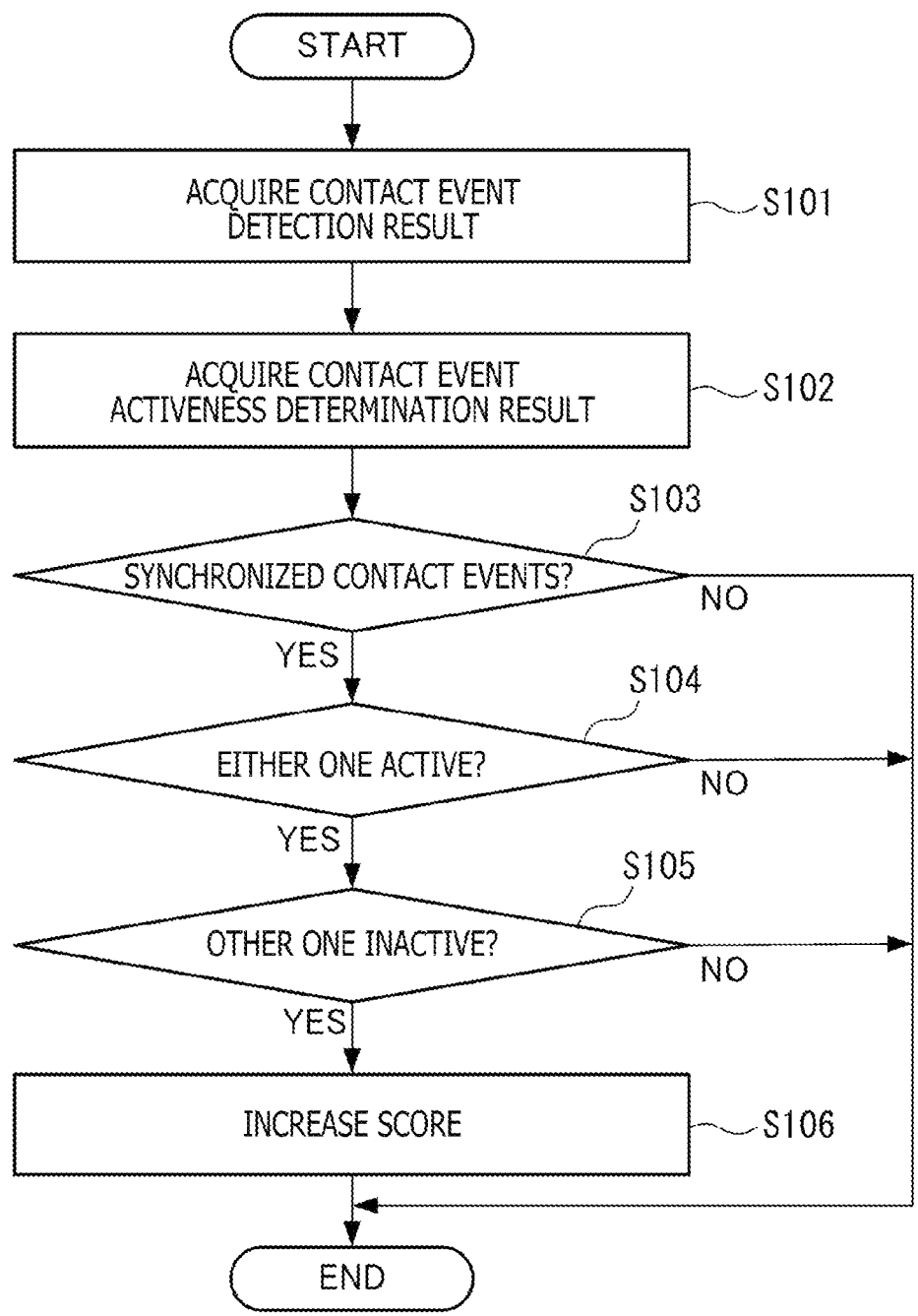
FIG. 13 is a flowchart illustrating an example of processing performed by a score calculation section in an embodiment of the present invention.

FIG. 13 is a flowchart illustrating an example of processing performed by a score calculation section in an embodiment of the present invention. In the depicted example, the score increase section 550 acquires the results of detection of contact events that have respectively occurred on the robots 100A and 100B (step S101), and acquires the results of determination of activeness of the respective contact events (step S102). In a case where contact events are synchronously detected on the robots 100A and 100B, ("YES" in step S103), either one of the synchronously detected contact events is active ("YES" in step S104), and the other contact event is inactive ("YES" in step S105), the score increase section 550 increases the score of the robot 100A or the robot 100B, whichever is involved in the detection of the active contact event (step S106).

In cases other than the one described above, that is, in a case where contact events are not synchronously detected on the robots 100A and 100B ("NO" in step S103), in a case where the synchronously detected contact events are both inactive ("NO" in step S104), and in a case where the synchronously detected contact events are both active ("NO" in step S105), the score increase section 550 increases neither the score of the robot 100A nor the score of the robot 100B.

It should be noted that, in the above example, the synchronously detected contact events need not necessarily be detected at the same time. The synchronously detected contact events may include, for example, a contact event acquired at a time that differs by a predetermined or smaller length from the time at which the result of detection of one of the synchronously detected contact events is acquired. The acceptable time difference is decided in consideration, for example, of a processing delay and a communication delay. The score increase section 550 increases the scores of the robots 100A and 100B in the manner described above, and decides the winner and the loser of the fighting game according to the scores made within a predetermined game time. Alternatively, the score increase section 550 may decrease the score of a side on which no active contact event is detected by the above-described process, and end the game at a time when an upper or lower threshold is reached by the score of either the robot 100A or the robot 100B.

According to measured values indicative of changes in the motion states of the parts of the housing of the robots 100A and 100B, the above-described embodiment of the present invention detects a contact event that has occurred on a part of the housing. Further, the above-described embodiment of the present invention determines the activeness of a detected contact event according to the relation to the moved portion. Moreover, the above-described embodiment of the present invention increases the scores of the robots 100A and 100B according to the synchronicity and the activeness of contact events detected respectively on the robots 100A and 100B, and decides the winner and the loser of the fighting game according to the resulting scores. It should be noted that, in the above examples, the torque values measured by the motors that drive the joints of the housing are used as the measured values indicative of the motion states of the parts of the housing. Alternatively, however, some other measured values acquired with use of, for example, acceleration sensors may be used as the measured values indicative of the motion states of the parts of the housing. Moreover, the contact events need not necessarily be detected on the housing of a robot. Alternatively, the contact events may be detected on a different device that is capable of actively moving.

While the preferred embodiments of the present invention are described in detail with reference to the accompanying drawings, the present invention is not limited to the above-described preferred embodiments. Persons of skill in the art to which the present invention relates will appreciate that various modifications and variations can be made within the scope of technical ideas described in the appended claims, and that such modifications and variations are obviously within the technical scope of the present invention.

REFERENCE SIGNS LIST

10: System
100, 100A, 100B: Robot
101, 101A, 101B: Head
102, 102A, 102B: Trunk
103, 103A, 103B, 104, 104A, 104B: Arm
103H, 104H: Hand
105, 105A, 105B, 106, 106A, 106B: Leg
105F, 106F: Foot
110: Information processing device
111: CPU
113: ROM
114: External memory
115: Bus interface
121: Communication interface
130: Motor
200A, 200B: Controller
300: Determination device
310: Information processing device
311: CPU
312: RAM
313: ROM
314: External memory
315: Bus interface
321: Communication interface
322: Display
510: Measured torque value acquisition section
520: Angle difference value acquisition section
530, 530A, 530B, 530C, 530D, 530E: Contact event detection section
540: Activeness determination section
550: Score increase section
551: Contact event detection result acquisition section
552: Activeness determination result acquisition section

The invention claimed is:

1. An information processing device comprising:
one or more memory devices configured to store instructions; and
one or more processors, that upon execution of the instructions, are configured to:
obtain one or more first measured torque values measured by a first motor that is configured to drive a first joint coupling a first part and a second part of a housing, wherein the first part is configured to support the second part;
obtain one or more second measured torque values measured by a second motor that is configured to drive a second joint coupling the second part and a third part including a free end of the housing, wherein the second part is configured to support the third part;
detect a contact event that has occurred on a part of the housing that is coupled by the first joint when a threshold value is less than the one or more first measured torque values or one or more values based on the one or more first measured torque values;
determine that the part of the housing is the third part if a threshold is less than a ratio of the second measured torque value to the first measured torque value; and
determine that the part of the housing is the second part if the threshold is equal to greater than the ratio.

2. The information processing device according to claim 1, wherein the one or more processors are configured to:
obtain a component of the one or more first measured torque values using low-pass filtering the one or more first measured torque values at a predetermined cut-off frequency; and
detect the contact event when the component is greater than a threshold range.

3. The information processing device according to claim 1, wherein the one or more processors are configured to detect the contact event when a threshold range is less than a difference between first measure torque values among the one or more first measure torque values measured at adjacent times.

4. The information processing device according to claim 1, wherein the one or more processors are further configured to obtain an angle difference value between a measured angle value and an indicated angle value regarding the motor that drives the joint of the housing, and wherein the one or more processors are configured to detect the contact event when a threshold is less than the angle difference value.

5. An information processing method comprising:
obtaining one or more first measured torque values measured by a first motor that is configured to drive a first joint coupling a first part and a second part of a housing, wherein the first part is configured to support the second part;
obtaining one or more second measured torque values measured by a second motor that is configured to drive a second joint coupling the second part and a third part including a free end of the housing, wherein the second part is configured to support the third part;
detecting a contact event that has occurred on a part of the housing that is coupled by the joint when a threshold value is less than the one or more first measured torque values or one or more values based on the one or more first measured torque values;
determining that the part of the housing is the third part if a threshold is less than a ratio of the second measured torque value to the first measured torque value; and
determining that the part of the housing is the second part if the threshold is equal to greater than the ratio.

6. A non-transitory, computer-readable storage medium containing a computer program, which when executed by a computer, causes the computer to carry out actions, comprising:
obtaining one or more first measured torque values measured by a motor that is configured to drive a joint of a housing; and
detecting a contact event that has occurred on a part of the housing that is coupled by the joint when a threshold value is less than the one or more first measured torque values or one or more values based on the one or more first measured torque values.

7. The information processing method of claim 5, further comprising:
obtaining a component of the one or more first measured torque values using low-pass filtering of the one or more first measured torque values at a predetermined cut-off frequency; and
detecting the contact event when the component is greater than the threshold range.

8. The information processing method of claim 5, further comprising:
detecting the contact event when the threshold range is less than a difference between first measure torque values measured at adjacent times among the one or more first measure torque values.

9. The information processing method of claim 5, further comprising:
obtaining an angle difference value between a measured angle value and an indicated angle value regarding the motor that drives the joint of the housing; and
detecting the contact event when a threshold is less than the angle difference value.

10. The non-transitory, computer-readable storage medium of claim 6, wherein the actions further comprise:
obtaining a component of the one or more first measured torque values using low-pass filtering the one or more first measured torque values at a predetermined cut-off frequency; and
detecting the contact event when the component is greater than the threshold range.

11. The non-transitory, computer-readable storage medium of claim 6, wherein the actions further comprise:
detecting the contact event when the threshold range is less than a difference between first measure torque values measured at adjacent times among the one or more first measure torque values.

12. The non-transitory, computer-readable storage medium of claim 6, wherein the actions further comprise:
obtaining an angle difference value between a measured angle value and an indicated angle value regarding the motor that drives the joint of the housing; and
detecting the contact event when a threshold is less than the angle difference value.

* * * * *